(12) United States Patent
Izumi

(10) Patent No.: US 6,400,428 B1
(45) Date of Patent: Jun. 4, 2002

(54) LIQUID CRYSTAL DEVICE/DISPLAY UTILIZING A PLURALITY OF ADJOINING DISPLAY PANELS TO FORM SINGLE DISPLAY SCREEN AND METHODS RELATED THERETO

(75) Inventor: Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/618,833

(22) Filed: Mar. 20, 1996

(30) Foreign Application Priority Data

Apr. 14, 1995 (JP) ............................................ 7-089696
Aug. 7, 1995 (JP) ............................................ 7-201077

(51) Int. Cl.[7] ........................ G02F 1/133; G02F 1/1333
(52) U.S. Cl. .......................... 349/73; 349/158; 349/187
(58) Field of Search ........................ 349/73, 187, 158; 345/4, 5, 6, 1

(56) References Cited

U.S. PATENT DOCUMENTS

| | | | |
|---|---|---|---|
| 4,408,836 A | * 10/1983 | Kikuno | 349/122 |
| 5,106,197 A | * 4/1992 | Ohuchida et al. | 359/83 |
| 5,315,101 A | 5/1994 | Hughes et al. | |
| 5,381,014 A | * 1/1995 | Jeromin et al. | 250/370.09 |
| 5,475,514 A | * 12/1995 | Zavracky et al. | 349/45 |
| 5,528,397 A | * 6/1996 | Zavracky et al. | 349/122 |
| 5,661,531 A | * 8/1997 | Greene et al. | 349/73 |
| 5,711,693 A | * 1/1998 | Nam et al. | 445/24 |
| 5,812,226 A | 9/1998 | Izumi et al. | |

FOREIGN PATENT DOCUMENTS

| | | |
|---|---|---|
| JP | 52-108836 | 9/1977 |
| JP | 56-167183 | 12/1981 |
| JP | 57-136616 | 8/1982 |
| JP | 61-262783 | 11/1986 |
| JP | 64-3824 | 6/1987 |
| JP | 4-075023 | 3/1992 |
| JP | 5-093902 | 4/1993 |
| JP | 7-098450 | 4/1995 |

OTHER PUBLICATIONS

Japanese Laid–Open Patent Publication No. Hei 5–315581, dated Nov. 26, 1993.
Handbook of Optics, vol. 1, McGraw–Hill, Inc., pp. 40.3 pp. 40.5, 1996.*
Schlam et al, Proceedings of the SPIE, High Resolution Displays and Projection Systerms, Feb. 1992.*

* cited by examiner

Primary Examiner—Kenneth Parker
(74) Attorney, Agent, or Firm—David G. Conlin; William J. Daley, Jr.; Dike, Bronstein, Roberts & Cushman, Intellectual Property Practice Group, Edwards & Angell, LLP

(57) ABSTRACT

A display device of a multi-panel system is composed of plural liquid crystal panels which are jointed together by means of a bonding agent, and offers an image displayed on a large screen, wherein at least one edge portion of an end surface of a connected part of each liquid crystal panel is chamfered. According to the described arrangement, an internal stress generated by the curing shrinkage of the bonding agent at the chamfered portion is dispersed when joining the liquid crystal panels together, thereby preventing an occurrence of cracks at the edge portion. In this way, light scattering due to cracks at the joint between liquid crystal panels can be prevented. Accordingly, a liquid crystal display device of a large screen that offers excellent visibility in which a joint between liquid crystal panels does not stand out can be achieved.

35 Claims, 9 Drawing Sheets

LIQUID CRYSTAL DEVICE/DISPLAY UTILIZING A PLURALITY OF ADJOINING DISPLAY PANELS TO FORM SINGLE DISPLAY SCREEN AND METHODS RELATED THERETO

FIELD OF THE INVENTION

The present invention relates to a display device for use in AV (audio visual) equipments or OA (office automation) equipments.

BACKGROUND OF THE INVENTION

Recently, there has been an increasing demand for home TV sets representing AV equipments and display devices for use in OA equipments of improved characteristics such as light weight, thin structure, low power consumption, high definition performance and large screen, etc. To meet these demand, the development of display devices such as a CRT (cathode ray tube) display, an LCD (liquid crystal display), a PDP (plasma display panel), an EL (electro luminescent) display, and an LED (light emitting diode) display has been made to achieve improved characteristics thereof, and some of the display devices of improved characteristics have already been used in practical applications.

Especially, the home AV equipments are more and more demanded for amusement purposes. The current home AV equipments' market also shows that a consumer's demand is gradually shifted to a larger screen thanks to a reduction in per inch cost. The introduction of the stereophonic sound system also requires home AV equipments to have large screens.

In the business world, there has been an increasing demand for display devices of improved characteristics that offer high visibility effect with easy handling, such as improved brightness not only in still image but also in moving image, that can be suitably used in presentation performance using a computer, etc. To respond to such demand for the described improved characteristics in the business world, a development of display devices of larger screen has been still more expected.

Among such display devices, liquid crystal display devices can be installed even in a small space with ease because of its beneficial features being lighter weight, narrower width, thinner structure than other display devices. Moreover, for other beneficial characteristics of low power consumption and being evolvable into full-color display with ease, the liquid crystal display' market has been expanded in various fields recently and the development of large-screen liquid crystal display devices has been more strongly demanded than other display devices.

However, when the screen of the liquid crystal display is upsized, as a defect image becomes more noticeable under the same resolution per screen, improvements in the resolution is necessary to achieve quality images of a video source. In the liquid crystal display device, an image is formed by display elements that are integrally formed and can be controlled independently, and thus to increase the number of display elements is inevitable to achieve an improved resolution.

However, the reduction in percent defective of each display element in the manufacturing process already faces the limit, and a significant progress is difficult to be expected.

Namely, to produce a greater number of display elements to meet the demand for the liquid crystal display device of a large screen would accelerate a drop in yield of the display device as a whole. Thus, it would be difficult to mass-produce the liquid crystal display device of a large screen which offers high quality images, and a cost for such liquid crystal display device remains too high.

To overcome the described difficulties, as shown in FIG. 2 of the present embodiment, a method of upsizing a screen using a so-called multi-panel display system has been proposed wherein an image is displayed on a large screen formed by joining plural liquid crystal display panels together. By adopting such system, even with the same percent defective of a single display element, as the defect is dispersed entirely on the display device, an overall improvement of a yield of the liquid crystal display device of a large screen which offers high quality images can be achieved while suppressing an increase in per unit area cost.

When forming a liquid crystal display device of a multi-display system, for example, as shown in FIG. 12(a), liquid crystal panels 52 are joined together. Specifically, the plural liquid crystal panels 52 are joined together so as to be adjacent to one another on a surface of a reinforcing substrate 53 to enable a liquid crystal display device of a still larger screen.

However, when joining plural liquid crystal display panels 52 together to enable such liquid crystal display device of a large screen, if an end surface portion 52c of the liquid crystal panel 52 contacts a medium of different index of refraction (air, etc.), light refraction would occur. Besides, if the end surface portion 52c becomes coarse in the manufacturing process, refraction and scattering of light would occur, thereby presenting the problem that the joint between the liquid crystal panels 52 stands out.

In consideration of the above problems, it is preferable that a hardened bonding agent used in bonding the liquid crystal panels 52 to the reinforcing substrate 53 has the same index of refraction as a hardened bonding agent used in joining the liquid crystal panels 52 together and that the index of refraction of these hardened bonding agents is substantially equal to the index of refraction of the reinforcing substrate 53 and substrates which constitute the liquid crystal panel 52, etc. By arranging so, refraction and scattering of light can be suppressed.

However, as shown in FIG. 12(b), in the case of adopting the bonding agent 59 under the described condition, a crack 59a may generate along the edge of the liquid crystal panels 52. This is because along an edge 52a (see FIG. 12(a)) of the liquid crystal panels 52, as stress concentrates by the curing shrinkage of the bonding agent 59, a crack 59a may be generated or may be expanded even with a small impact. When light passes through such crack 59a, light scattering would occur, which again makes the joint between the liquid crystal panels 52 stand out.

With the described curing shrinkage, a partial pealing 59b occurs between the end surface portion 52c of the connected part of the liquid crystal panels 52 and the bonding agent 59, which would cause the light scattering.

Additionally, when the face precision of the end surface portion 52c is low, since the bonding agent 59 is not spread entirely on the irregularity of the end surface portion 52c, fine bubbles may remain in the space between the end surface portion 52c of the liquid crystal panel 52 and the bonding agent 59. Such fine bubbles remaining in the space may again cause a scattering of light.

Namely, to display a natural image on a large screen, it is required to prevent an occurrence of light scattering, for example, by preventing a generation of the crack 59a, the peeling 59*b* or bubbles as this makes the joint between the liquid crystal panels 52 noticeable.

SUMMARY OF THE INVENTION

It is therefore an object of the present invention to provide a display device of a large screen formed by joining plural panels together which offers a natural image without generating light scattering at a connected part of the panels.

To fulfill at least the above-mentioned object, an example display device in accordance with the best presently contemplated embodiment of the present invention includes:

plural display panels, adjoining display panels being connected with each other by means of a bonding agent so as to have a single display screen, wherein at least one edge portion of an end surface of a connected part of each display panel is chamfered.

In the display device having the described arrangement, a space between adjoining display panels is filled with the bonding agent, and when joining the display panels together, a concentration of the internal stress caused by a curing shrinkage of the bonding agent is suppressed at the chamfered edge portion. Namely, at such edge portion, as a maximum value of the internal stress becomes smaller than an intermolecular bond strength of the bonding agent, a generation of cracks around the edge portion can be prevented. Therefore, as light scattering caused by such cracks can be reduced, a desirable display device of a large screen having an excellent visibility in which a joint of the display panels is not noticeable can be achieved.

In furtherance of the above-mentioned object, an example of the display device of the present invention includes plural display panels, adjoining display panels being connected with each other by means of a bonding agent, so as to have a single display screen, wherein an interval between the adjoining display panels is not more than 50 $\mu$m.

According to the described arrangement, as the interval between the adjoining display panels is selected to be not more than 50 $\mu$m, the absolute value of the volumetric shrinkage due to the curing shrinkage of the bonding agent can be made smaller. This enables a value of the internal stress generated in the hardened bonding agent to be smaller than the intermolecular bond strength of the hardened bonding agent, thereby preventing a generation of cracks due to the hardened bonding agent around the edge portion. In the meantime, the internal stress is smaller than the bond strength between the bonding agent and the display panels, thereby preventing a generation of a peeling. As this prevents light scattering caused by cracks or a peeling at the connected part of the display panels, a desirable display device of a large screen having an excellent visibility in which a joint of the adjoining display panels is not noticeable can be achieved.

To achieve the above-mentioned object, another example of the display device in accordance with the present invention includes plural display panels, adjoining display panels being connected with each other by means of a bonding agent, so as to have a single display screen, wherein the hardened bonding agent has a flexural modulus of elasticity of not more than 4,000 kgf/cm$^2$.

According to the described arrangement of the display device, even under the same curing shrinkage of the bonding agent, the internal stress generated by the curing shrinkage of the bonding agent is absorbed by the elasticity (flexibility) of the bonding agent. Namely, as the maximum value of the internal stress becomes smaller than the intermolecular bond strength of the hardened bonding agent, a generation of cracks due to the hardened bonding agent around the edge portion can be prevented. Furthermore, as the internal stress can be made smaller than the bond strength between the bonding agent and the display panels, a generation of peelings can be prevented. Namely, as light scattering due to cracks or peelings generated at the connected part of the display panels can be suppressed, a desirable display device of a large screen having an excellent visibility in which a joint of the display panels is not noticeable can be achieved.

To achieve the above-mentioned object, a display device in accordance with the present invention includes: plural display panels, adjoining display panels being connected with each other by means of a bonding agent, so as to have a single display screen, wherein an end surface portion of a connected part of each display panel has a cut surface finishing precision of not more than 2 $\mu$m.

According to the described arrangement of the display device, as the bonding agent can be more efficiently spread on the end surface portions of the display panels, generation of bubbles in a space between the end surface portions of the connected parts and the bonding agent can be prevented. Namely, the improved wettability permits display panels to be joined together without having residual bubbles remaining on the interface with the bonding agent, thereby preventing light scattering caused by such bubbles. As a result, a desirable display device of a large screen having an excellent visibility in which a joint of the display panels is not noticeable can be achieved.

To fulfill the above-mentioned object, a display device in accordance with the present invention includes plural display panels, adjoining display panels being connected with each other by means of a bonding agent, so as to have a single display screen, wherein an end surface of a connected part of each display panel has a cut surface positioning precision of not more than 10 $\mu$m.

In the display device of the described arrangement, the width of the connected part of the display panels can be reduced. Specifically, the width of the connected part of the display panels can be reduced to not more than 20 $\mu$m. Therefore, even under fluctuating index of refraction of the bonding agent, an adverse effect on color, or distortion of an image formed by light passing through the connected part of the display panels can be suppressed, thereby achieving a desirable display device of a large screen having an excellent visibility in which a joint of the display panels is not noticeable.

For a fuller understanding of the nature and advantages of the invention, reference should be made to the ensuing detailed description taken in conjunction with the accompanying drawings.

DESCRIPTION OF THE EMBODIMENTS

First Embodiment

The following descriptions will discuss one embodiment of the present invention in reference to FIG. 1 through FIG. 4.

Figure 2:
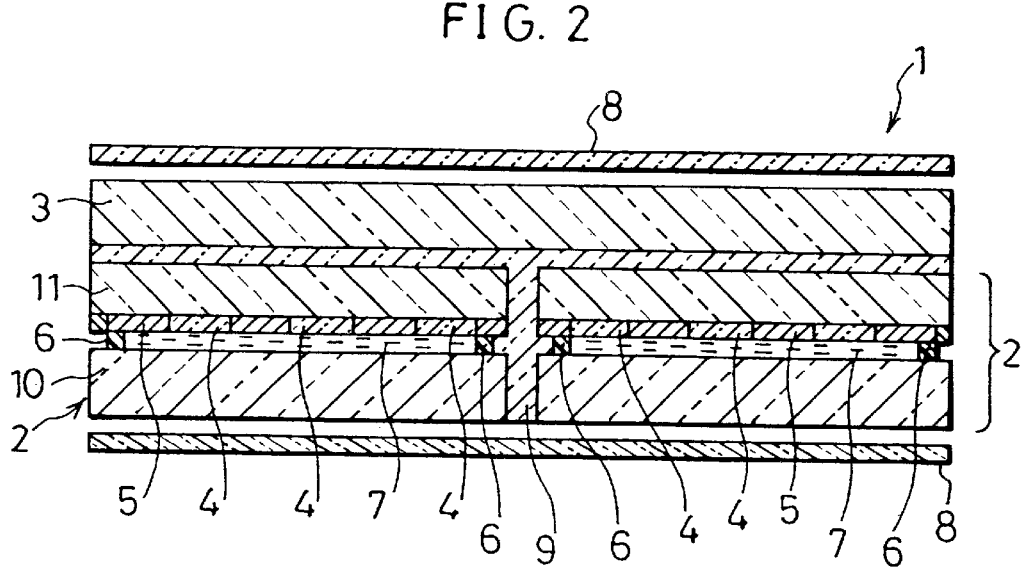
FIG. 2 is a cross sectional view showing a schematic configuration of the liquid crystal display device.

As shown in FIG. 2, a liquid crystal display device 1 in accordance with the present embodiment is of the direct sight type. The liquid crystal display device 1 includes liquid crystal panels 2 of an active matrix type provided on one surface of a reinforcing substrate 3 of an sufficient size to entirely cover the display screen of the liquid crystal display device 1. The liquid crystal display device 1 also includes polarization plates 8 (to be described later) which sandwich the reinforcing substrate 3 and the liquid crystal panels 2 in-between, a back light (not shown) such as a cold cathode gas discharge tube, for directing light onto the liquid crystal panels 2, and a driver (not shown) for driving the liquid crystal panels 2 based on the image information for displaying an image. The back light is provided on an opposite side to the reinforcing substrate 3, provided side of the two liquid crystal panels 2 (i.e., under the liquid crystal panels 2 in FIG. 2).

When each liquid crystal panel 2 is driven by the driver, an alignment of liquid crystals varies in response to the image information. As a result, the liquid crystal panels 2 modulates light emitted from the back light, thereby displaying an image according to received image information.

Figure 3:
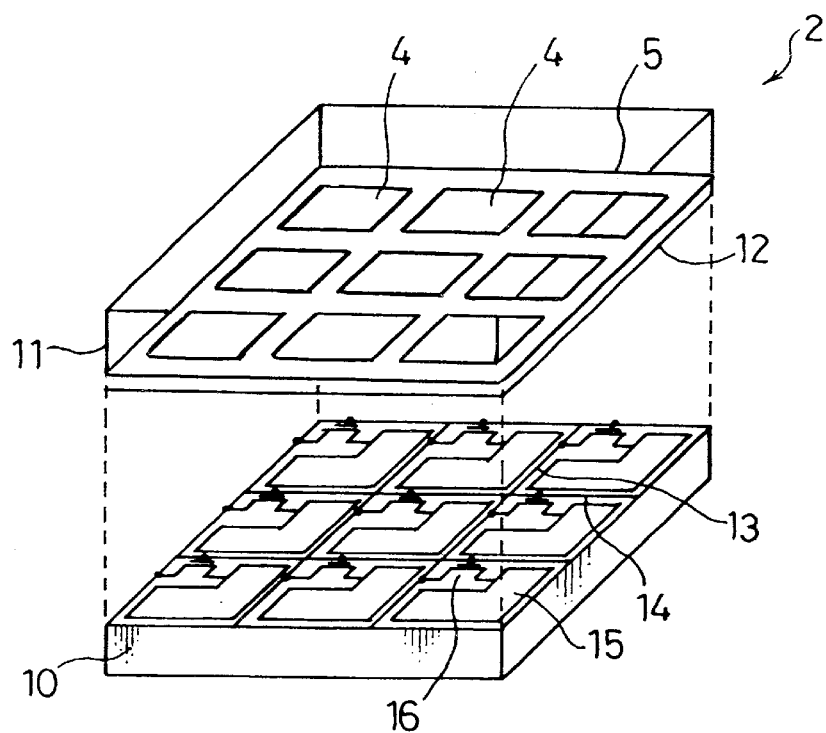
FIG. 3 is an explanatory view schematically showing a structure of the liquid crystal panel provided in the liquid crystal display device.

As shown in FIG. 3, each liquid crystal panel 2 has a well-known panel structure of active matrix type adopting active elements in matrix. More specifically, each pixel is provided with a switch that completely cuts off an irrelevant signal when its pixel is not selected to eliminate the crosstalk generated between scanning electrodes in case of a structure of simple matrix type. The switch is referred to as an active element and the described system is called "active matrix type". Examples of such active element include 2-terminal elements (diode) and 3-terminal elements (transistor).

On the first substrate 10 made of glass or other materials, scanning electrodes 14 and data electrodes 13 are provided, and a plurality of TFT's (Thin Film Transistors) 16 and a plurality of pixel electrodes 15 respectively connected to the TFT's 16 are provided around each intersection point of the data electrodes 13 and the scanning electrodes 14 respectively. TFT 16 is a transistor of an electric field effect type having a semiconductor thin film such as amorphous silicon (a-Si:H) or polycrystalline silicon (p-Si), and controls the supply of the image signal to the pixel electrodes 15. Each pixel electrode 15 is a transparent electrically conductive film made of ITO (Indium Tin Oxide) or the like when used for a light transmitting type display device and a reflective electrically conductive film made of aluminum (Al) or the like when used for a reflecting type display device.

On the other hand, on a second substrate 11, formed is a common electrode 12. In case of color display, color filters 4 for RGB (red, green, and blue) are additionally provided corresponding to respective pixel electrodes 15, and a black matrix 5 is formed on the second substrate 11 to separate the respective pixels. The black matrix 5 is provided so as to cover the periphery of each pixel electrode 15. More precisely, the black matrix 5 is provided to block the light entering the spaces between the pixel electrodes 15 or an area of the TFTs 16. This is because if the light passes through the area other than the pixel electrodes 15, the display quality in black degrades, and hence the contrast blurs. Also, if the TFTs 16 receive light, they would be photo-excited and a leak current would occur within TFT channels, thereby degrading the display quality. The black matrix 5 is provided to prevent the occurrence of such problems.

The black matrix 5 may be provided on the side of the first substrate 10 instead of the second substrate 11 side.

The liquid crystal panel 2 is formed by bonding the first substrate 10 and the second substrate 11 together by means of a seal material 6 shown in FIG. 2 in such a manner that the pixel electrodes 15 and the common electrode 12 are opposed to each other, and by filling liquid crystal 7 between the first and second substrates 10 and 11.

In the next step of joining two liquid crystal panels 2 together, as shown in FIG. 2, a connected part between liquid crystal panels 2 is filled with a bonding agent 9 which also serves as a refraction index adjusting material. Here, if the bonding agent 9 does not have the same index of refraction as the liquid crystal panel 2, light scattering would occur due to roughness formed on the end surfaces of the first substrate 10 and the second substrate 11 which constitute the liquid crystal panel 2, and the joint between liquid crystal panels 2 would stand out. Additionally, it is preferable to use the bonding agent 9 also in bonding the liquid crystal panels 2 to the reinforcing substrate 3. If the light reflects on the interface between the reinforcing substrate 3 and the second substrate 11, a contrast of the display would be lowered.

In this embodiment, glass substrates (Corning 7059) having an index of refraction of 1.53 are adopted for the first and second substrates. Thus, a material of an index of refraction of 1.53 is required for the bonding agent 9.

For example, a ultraviolet ray hardening resin having the following characteristics may be used. Such a ultraviolet ray hardening resin has (1) a double bond such as acrylic and ene/thiol (polyene/polythiol), the double bond being cleft upon projection of the ultraviolet ray to progress polymerization, and (2) an index of refraction of 1.53 after being hardened.

The liquid crystal display device also includes a pair of polarization plates 8 formed on both sides of the two liquid crystal panels 2 which are joined together in the described manner. Specifically, the pair of polarization plates 8 are arranged so as to cover an entire surface of the liquid crystal panels 2 in such a manner that respective polarization axes intersect at right angles. The liquid crystal display device of direct viewing type is generally provided with a back light (not shown) such as a cold cathode gas discharge tube, etc. Light directed to the liquid crystal panel from the back light is modulated according to image information inputted to the liquid crystal panel, thereby displaying an image according to the image information.

As described, the liquid crystal display device 1 in accordance with the present embodiment includes the pair of polarization plates 8 provided on the sides of the two liquid crystal panels 2 which are joined together in the described manner. Specifically, the polarization plates 8 are provided so as to sandwich the two liquid crystal panels 2 and the reinforcing substrate 3 in-between. Further, the polarization plates 8 are provided on both sides of the liquid crystal panels 2 in such a manner that polarization axes intersect at right angles. Accordingly, light leakage through the connected parts of the liquid crystal panels 2 are in black under the crossed nicol state of the polarization plates 8. Thus, the joint between the liquid crystal panels 2 is not noticeable.

Figure 1:
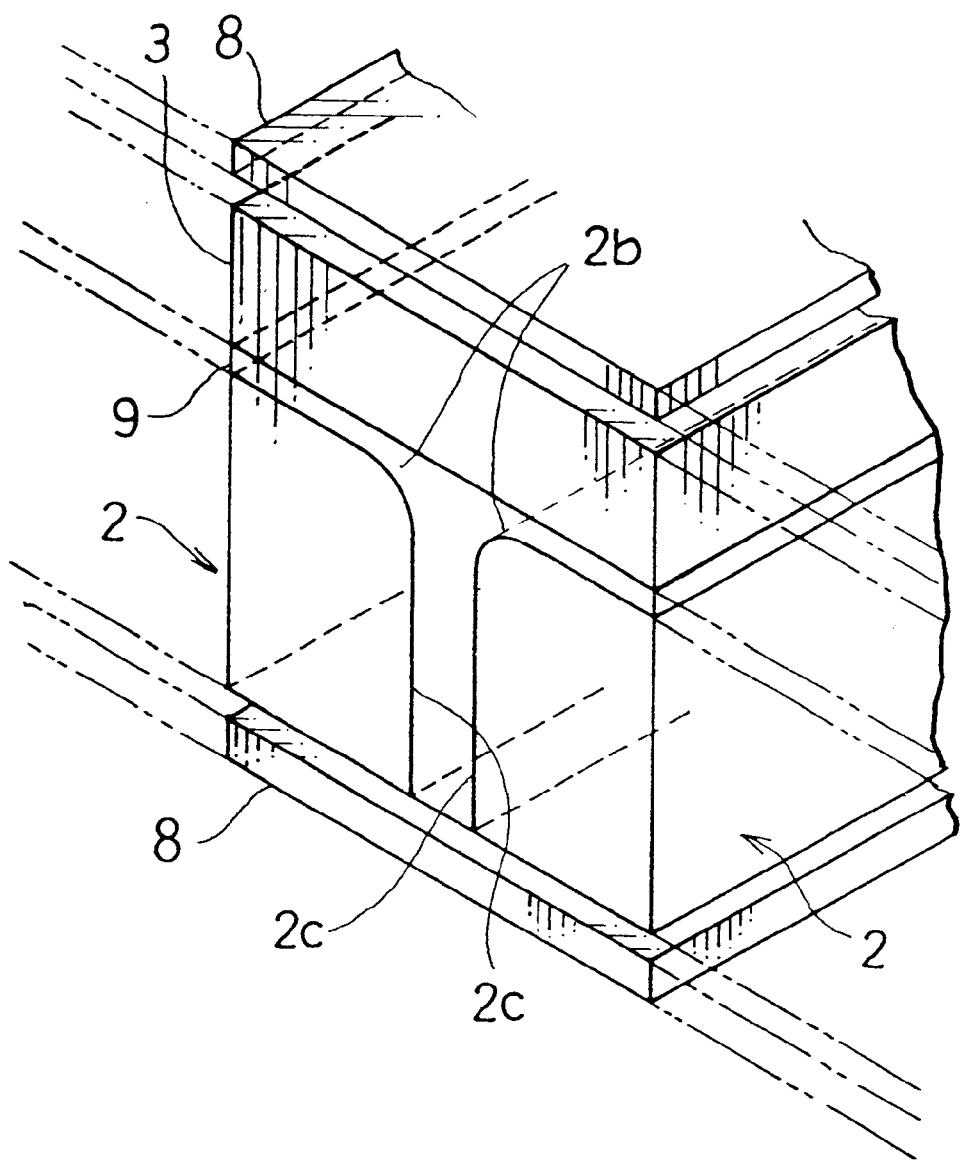
FIG. 1 is a perspective cross sectional view showing a joint between liquid crystal panels of a liquid crystal display device in accordance with one embodiment of the present invention.

FIG. 1 is an enlarged view of the joint between the liquid crystal panels 2 of the liquid crystal display device 1 in accordance with the present embodiment. In the liquid crystal display device 1, end surfaces of the two liquid crystal panels 2 are joined together by means of a bonding agent 9, and the liquid crystal panels 2 are bonded to the reinforcing substrate 3 by means of the bonding agent 9.

Figure 12A:
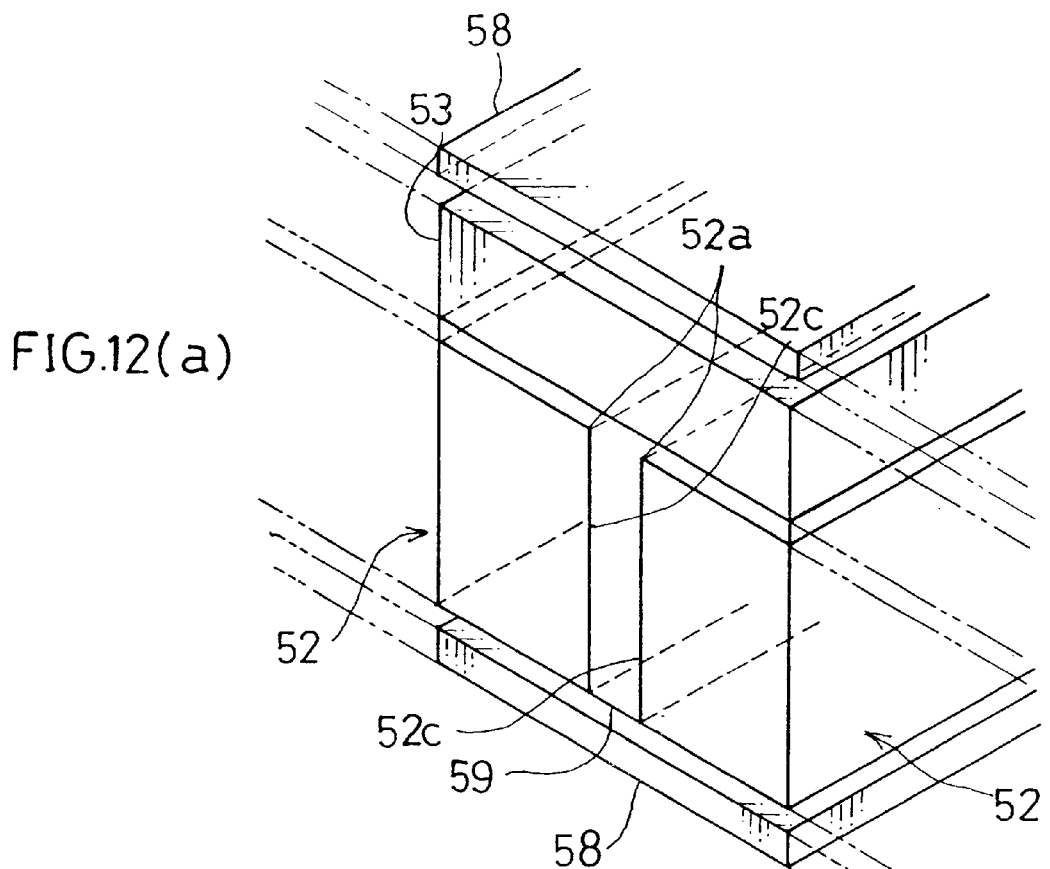
FIG. 12(a) and FIG. 12(b) are perspective cross sectional views showing a connected part between liquid crystal panels of a conventional liquid crystal display device of a multi-panel display system.

The bonding agent 9 used in bonding the reinforcing substrate 3 to the liquid crystal panels 2 is an ultraviolet-ray-hardening type bonding agent, and the bonding agent 9 is hardened by projecting an ultraviolet ray on the bonding agent 9 in fluid state. By the shrinkage of 5%–10% occurred during the hardening process, the tensile stress occurs in the bonding agent 9. For example, if the liquid crystal panels 2 have edges like the conventional edges 52a shown in FIG. 12(a), the stress would be concentrated near the edge 52a, which would cause the generation of the cracks 59a. Furthermore, light which passes through the cracks 59a would be scattered, and even with the polarization plates 58, light in a direction of the polarization direction of the polarization plate 58 would leak. Thus, the generation of such cracks 59a would make the joint between liquid crystal panels 52 stand out, thereby hindering the development of the multi-panel display of the liquid crystal display device.

In the liquid crystal display device 1 of the present embodiment, a chamfer 2b in a circular arc shape is formed at an edge portion on an end surface of the connected part of the liquid crystal panels 2 as shown in FIG. 1. This permits the internal stress generated in the bonding agent 9 to be reduced entirely on the chamfer 2b, thereby preventing a generation of the cracks 59a shown in FIG. 12(b).

Figure 4:
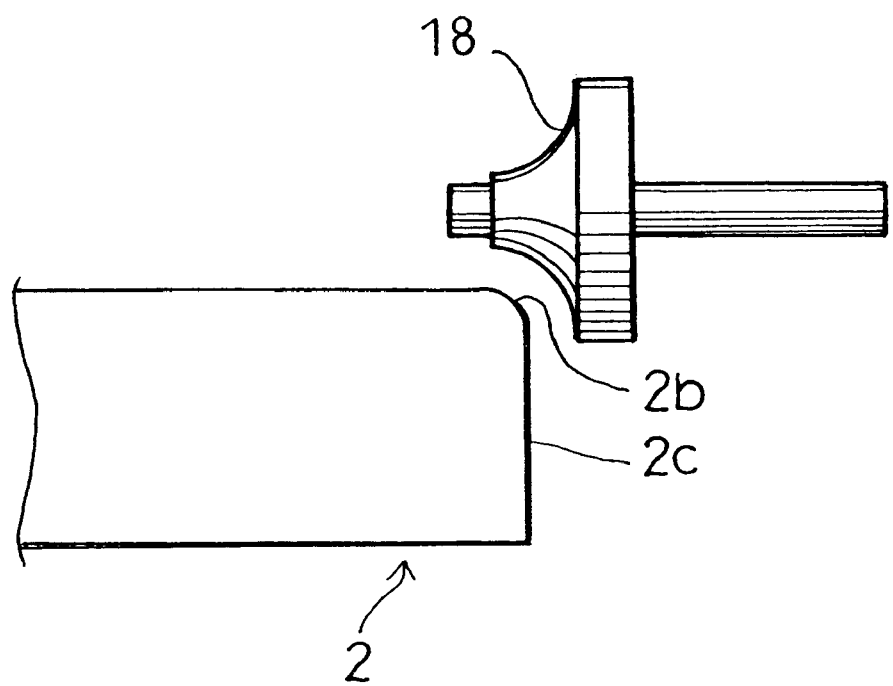
FIG. 4 is an explanatory view showing an example of a process of grinding the liquid crystal panel.

In the present embodiment, the chamfer 2b is formed in a circular arc shape with a radius of 0.3 mm. As shown in FIG. 4, for example, the chamfer 2b in a circular arc shape is formed by grinding the edge portion of the liquid crystal panel 2 by rotating a grindstone 18 having a curved portion.

In the described process, by performing the two-stage grinding processes: first performing a coarse grinding process with a grindstone with particle size in a range of #300–#500, and thereafter performing a finishing grinding process with a grindstone with particle size in a range of #800–#1600, a still smoother chamfer 2b can be obtained.

The radius of the chamfer 2b in a circular arc shape may be suitably adjusted in consideration of the thickness of the liquid crystal panel 2 and placement conditions of the liquid crystal display device 1, etc. Additionally, the shape of the chamfer 2b is not limited to the circular arc shape, and any other shapes which prevent the stress to be concentrated can be adopted.

As described, by forming the chamfer 2b in circular arc shape at the edge portion on the end surface of the connected part of the liquid crystal panels 2, a desirable liquid crystal display device 1 which prevents light scattering, wherein a joint between liquid crystal panels 2 is not noticeable can be achieved.

Second Embodiment

The following descriptions will discuss another embodiment of the present invention in reference to FIG. 5 through FIG. 8. For convenience in explanations, members having the same function as the aforementioned embodiment will be designated by the same reference numerals, and thus the descriptions thereof shall be omitted here.

Figure 5A:
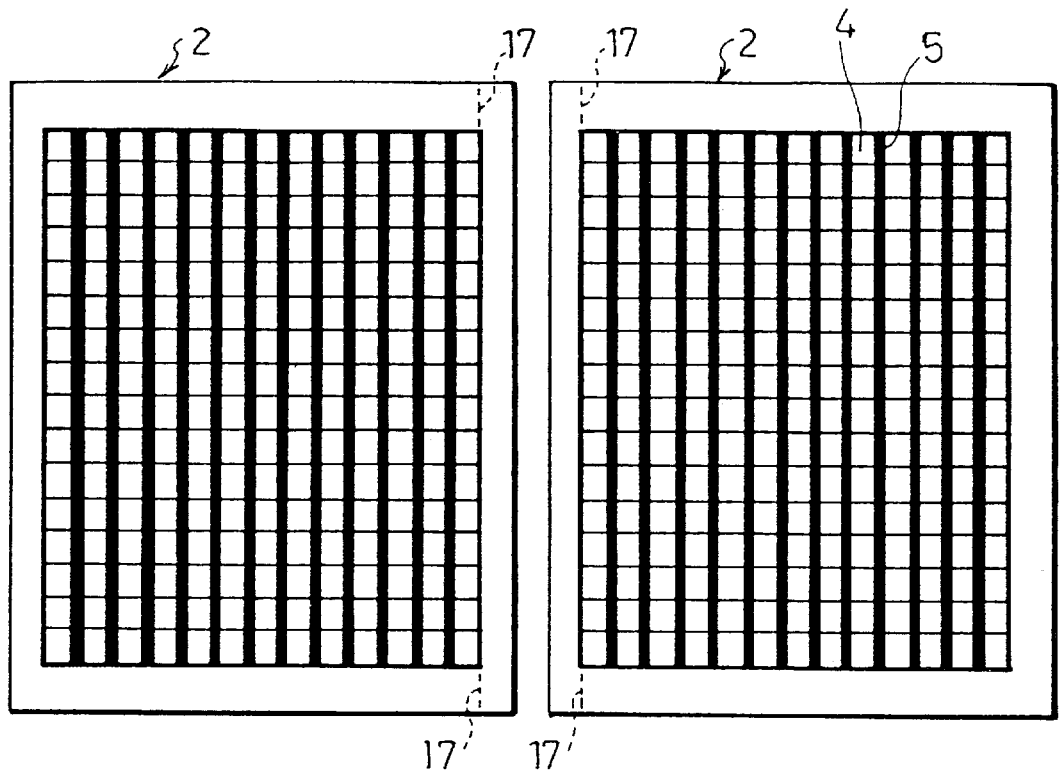
FIG. 5(*a*) is a plan view showing a cutting position for a part to be connected in the process of forming each liquid crystal panel of a liquid crystal display device in accordance with another embodiment of the present invention.
FIG. 5(b) is a plan view showing the state in which the liquid crystal panels of FIG. 5(a) are joined together after their parts being cut.
Figure 5B:
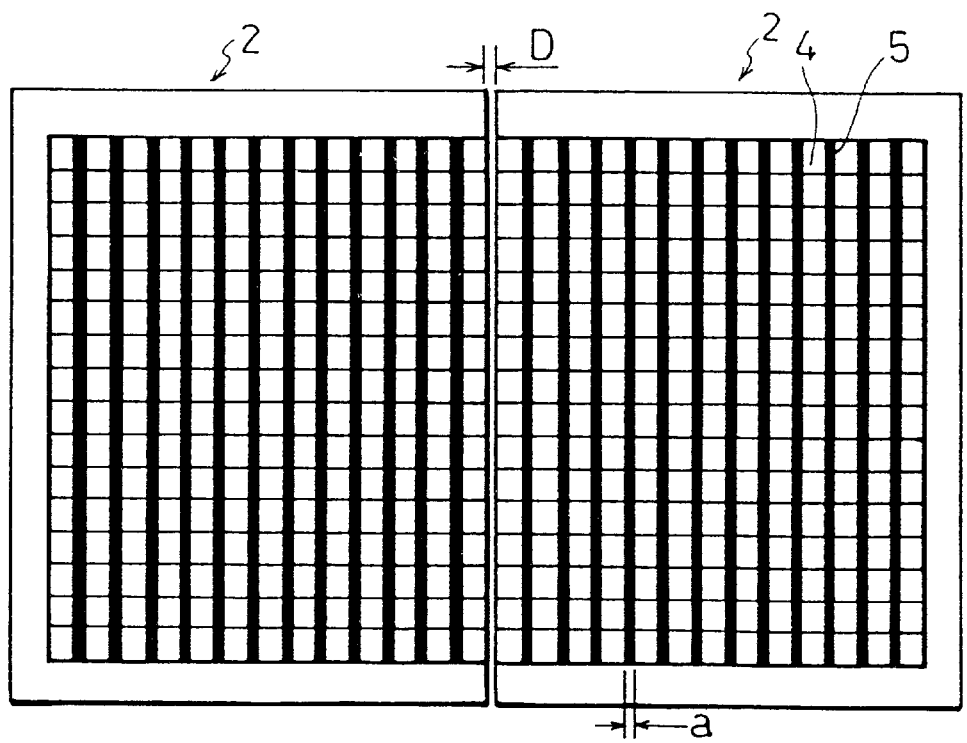

FIG. 5(a) is a plan view showing a cutting position for a part to be connected in the process of bonding each liquid crystal panel 2. FIG. 5(b) is a plan view showing the state in which the liquid crystal panels 2 are joined together after their parts being cut. As shown in FIG. 5(a), one side of each liquid crystal panel 2 is cut along a cutting line 17 near an end of each image display area. Thereafter, the two liquid crystal panels 2 are bonded to the reinforcing substrate 3 in such a manner that the respective cut portions of the liquid crystal panels 2 are connected to each other.

As shown in FIG. 5(b), the liquid crystal panels 2 are typically connected in such a manner that the width D of the space (connected parts) therebetween becomes narrower than the trace width a of the black matrix 5 required for each pixel. Otherwise, the pixel pitch becomes irregular at the connected parts of the liquid crystal panels 2 and makes the image on the screen unnatural.

Figure 6:
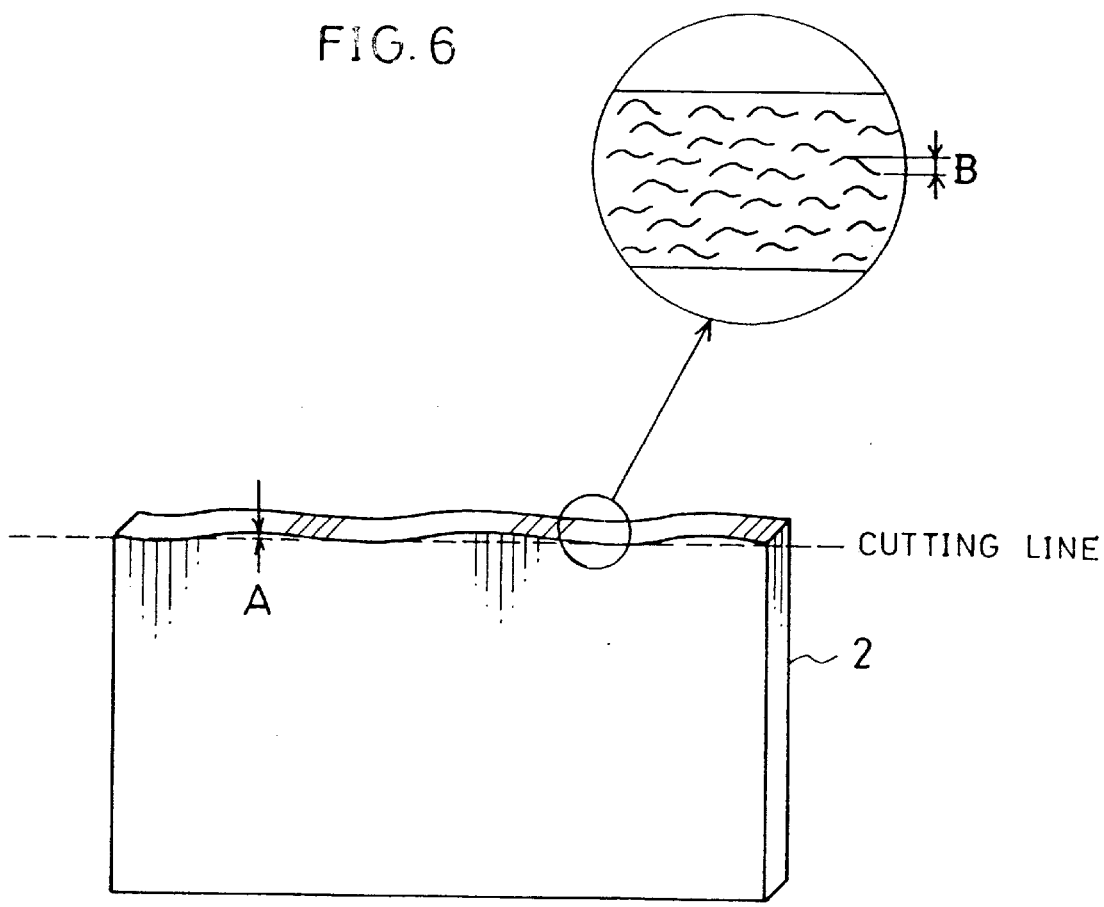
FIG. 6 is a perspective view of the liquid crystal panel explaining a cut surface positioning precision and a cut surface finishing precision.

Thus, cutting of the liquid crystal panel 2 requires high quality with respect to a cut surface positioning precision and a cut surface finishing precision. Should the cutting line 17 of each liquid crystal panel 2 be distorted, or should the cut surface be irregular with projections and recessions of some hundreds of microns, respectively, the liquid crystal panels 2 would be connected with a space wider than the trace width a. However, when the liquid crystal panel 2 is cut by a conventional scribing method, the cut surface is always distorted by some hundreds of microns. Thus, it is preferable to use a dicing device to cut the liquid crystal panel 2 when a high cut surface positioning precision and a high cut surface finishing precision are desired. If the dicing device is used, the cut surface positioning precision and the cut surface finishing precision are respectively 50 $\mu$m or less and 5 $\mu$m or less are obtained, at the connected parts of the liquid crystal panels 2. As shown in FIG. 6, the cut surface positioning precision suggests the maximum value A of the displacement of a cutting line defined with respect to the cutting line on design. The cut surface finishing precision suggests the maximum height B in the surface roughness shown by the enlarged circle in the figure. Thus, the width D of the space can be narrower than the trace width a of the black matrix 5 so that the pixel pitch can be consistent across the entire liquid crystal display device 1.

Figure 12B:
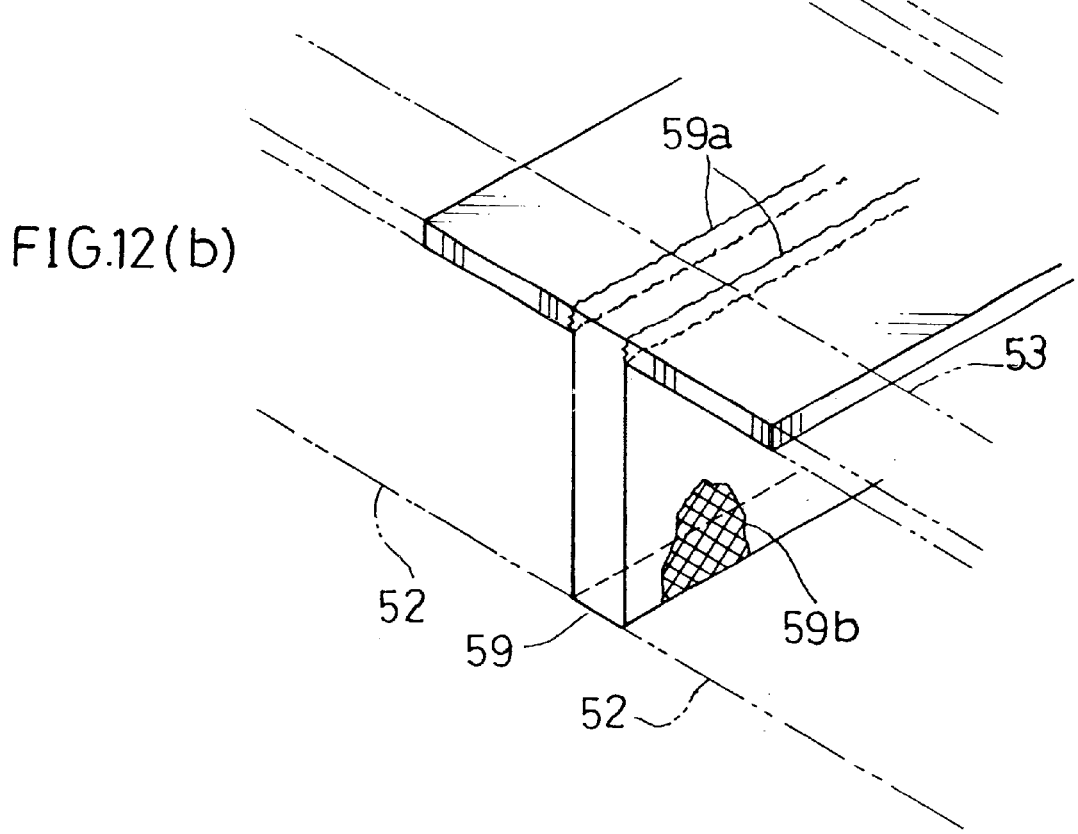

However, when joining the side surfaces of the liquid crystal panels 2 by means of the bonding agent 9, the curing shrinkage of the bonding agent 9 should be taken into consideration. Specifically, such concentration of the internal stress is generated due to the curing shrinkage of the bonding agent 9 may cause the cracks 59a of the bonding agent 59 to be generated around the edge portion 52a of the liquid crystal panel 52 or the peeling 59b to be generated between the end surface portion 52c and the bonding agent 59 as shown in FIG. 12(b).

Such problem of generating cracks 59a and the peeling 59b can be prevented, for example, by the following arrangement. Since the internal stress is caused by the hardened-shrinkage of the bonding agent, an absolute value of the volumetric shrinkage can be reduced by reducing the volume of the bonding agent to be used. As a result, the internal stress caused by the curing shrinkage of the bonding agent can be suppressed.

In general, such cracks 59a or peeling 59b is generated when employing the bonding agent 59 of a large flexural modulus of elasticity (hereinafter simply referred to as a modulus of elasticity), i.e., high rigidity. The described problems can be solved by adopting the bonding agent of a small coefficient of elasticity, as the effect from the curing shrinkage can be absorbed by the elasticity of the bonding agent.

Figure 7:
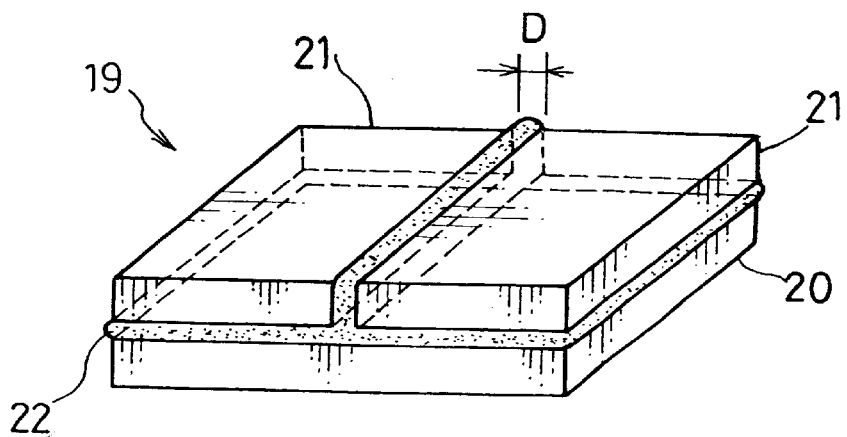
FIG. 7 is a perspective view showing the structure of samples used in experiments.

Based on the described assumption, plural samples 19 shown in FIG. 7 are prepared to observe respective cracks generating states.

Each sample 19 is prepared by connecting a glass plate 20 (width 60 mm×depth 100 mm×thickness 2.8 mm) as the reinforcing substrate and glass substrates 21 (width 30 mm×depth 100 mm×thickness 2.2 mm) as the liquid crystal panels using a bonding agent 22 whose applied thickness is set to be the same as that of the practically used liquid crystal display device.

Figure 8:
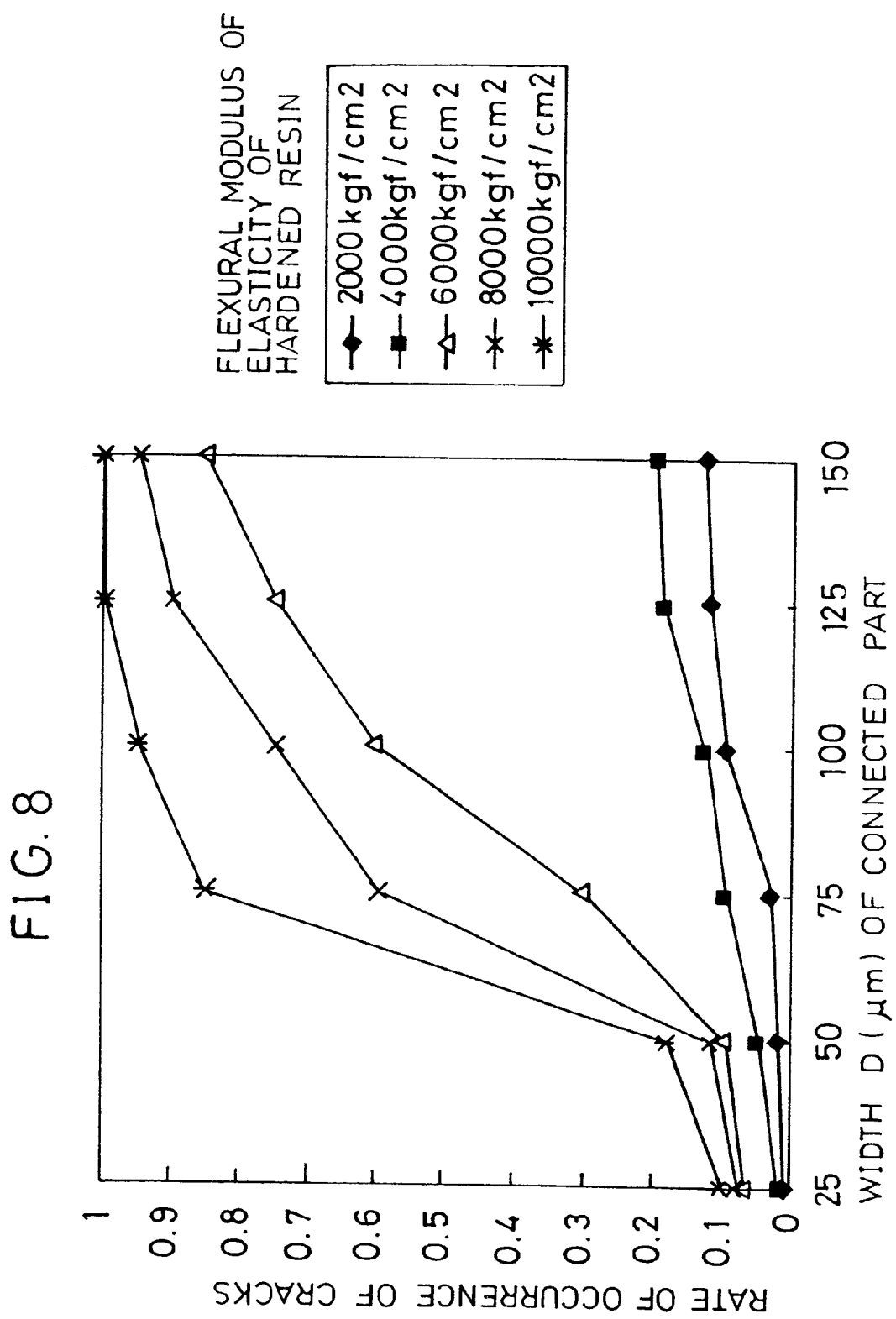
FIG. 8 is a graph showing results of measurements of cracks generated at the edge portion when adopting bonding agents of different flexural modulus of elasticity in their hardened state, wherein an x-axis indicates a width D of the connected part of the sample, while a y-axis indicates a rate of occurrence of cracks, normalized based on a maximum number of cracks.

Samples 19 of various kinds are prepared by altering the width D of the space (connected parts) of the glass substrates 21 using various kinds of the bonding agent 22. The number of cracks generated around the edge portions is observed for each sample 19, and the results are shown in the graph of FIG. 8.

The results show that when adopting a resin of a coefficient of elasticity of not more than 4,000 kgf/cm$^2$, the number of cracks generated by the curing shrinkage of the bonding agent 22 is significantly reduced irrespectively of the width D of the connected part. Therefore, by adopting a resin of a coefficient of elasticity of not more than 4,000 kgf/cm$^2$, the internal stress generated by the distortion caused by the curing shrinkage of the bonding agent 22 is significantly absorbed by the elasticity (flexibility) of the bonding agent 22. Namely, the maximum value of the internal stress can be made not more than the intermolecular bond strength, and the number of cracks generated near the edge portion can be expected to be reduced.

The results based on samples 19 also show that even when adopting the resin of a coefficient of elasticity of not less than 4,000 kgf/cm$^2$ (resin of a coefficient of elasticity of not less than 6,000 kgf/cm$^2$ in the experiment) as the bonding agent 22, the number of cracks generated by the curing shrinkage of the bonding agent 22 can be significantly reduced by selecting the width D of the connected part to be not more than 50 μm irrespectively of the kind of the resin.

Namely, when the width D is selected to be not more than 50 μm, the internal stress can be reduced as the absolute amount of shrinkage can be reduced without being affected by the characteristics which can greatly affect the generation of the crack, such as the coefficient of elasticity of the bonding agent, etc. As a result, the maximum value of the internal stress can be made not more than the intermolecular bond strength of the bonding agent 22, and the number of cracks generated around the edge portion can be expected to be reduced.

In the described samples 19, a peeling 59b shown in conventional example of FIG. 12(b) is not observed on interfaces between the bonding agent 22 and glass plates 21.

From the results of the experiment, in the liquid crystal display device 1 of the first embodiment, even with a removal of the chamfer 2b in a circular arc shape at the edge portion of an end surface of the connected part of the liquid crystal panels 2, the generation of the cracks and the peeling between the end surface portion 2c and the bonding agent 9 can be prevented by adopting the resin of a coefficient of elasticity of not more than 4,000 kgf/cm$^2$ as the bonding agent 9, or selecting the width D of the connected part between the liquid crystal panels 2 to be not more than 50 μm. As a result, the generation of the cracks around the edge portion of the end surface of the connected part of the liquid crystal panels 2 and the generation of the peeling between the end surface portion 2c and the bonding agent 9 can be expected to be prevented.

Additionally, by selecting the width D of the connected part between the liquid crystal panels 2 to be not more than 50 μm, adverse effects from the photo-absorption or the birefringence in a bonding agent layer can be reduced in addition to the effect of suppressing the generation of the cracks and the peeling in the bonding agent 9, thereby achieving an improved display performance.

A liquid crystal display device 1 is actually prepared by setting the position of the cutting lines 17 so as to have the width D of the connected part between the liquid crystal panels 2 of 50 μm using a resin of a coefficient of elasticity of 10,000 kgf/cm$^2$ as the bonding agent 9. In the resulting liquid crystal display device 1, cracks or a pealing are not observed around the connected part, and the joint between the liquid crystal panels 2 is not noticeable.

Another liquid crystal display device 1 is actually prepared with the width D of the connected part between the liquid crystal panels 2 of 100 μm using a resin of a coefficient of elasticity of 2,000 kgf/cm$^2$ as the bonding agent 9. In the resulting liquid crystal display device 1, cracks or a peeling are not observed around the connected part, and the joint between the liquid crystal panels 2 is not noticeable.

Third Embodiment

Figure 9A:
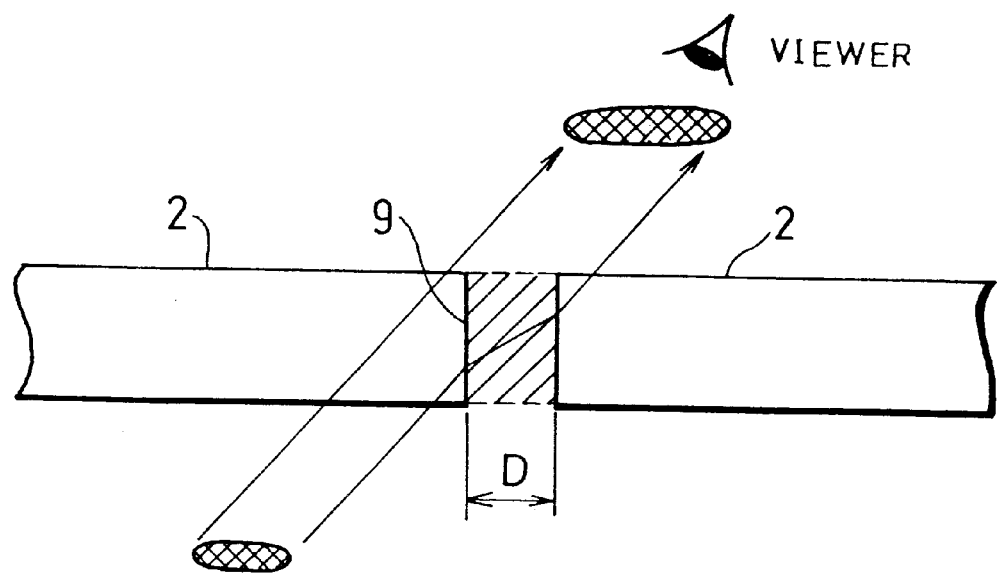
FIG. 9(a) and FIG. 9(b) are explanatory views showing a change in degree of deformation of the image that passes through the connected part in response to a variable width of the connected part.
Figure 9B:
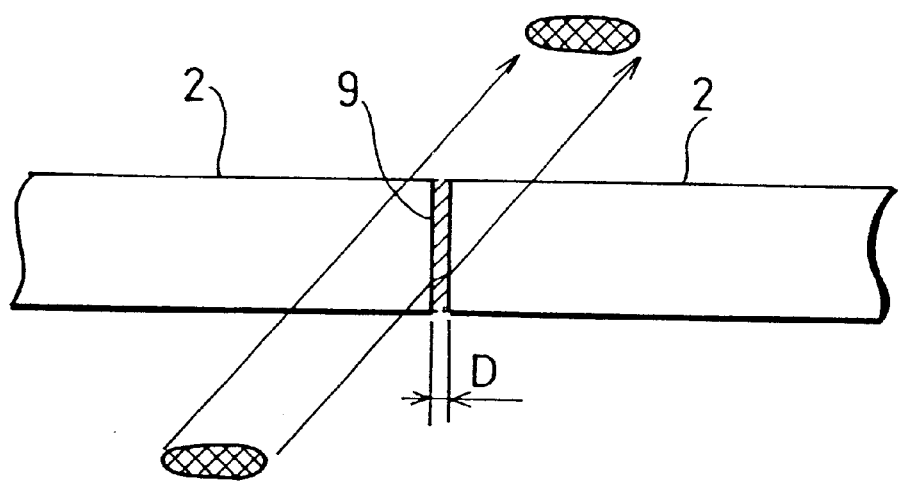
Figure 10:
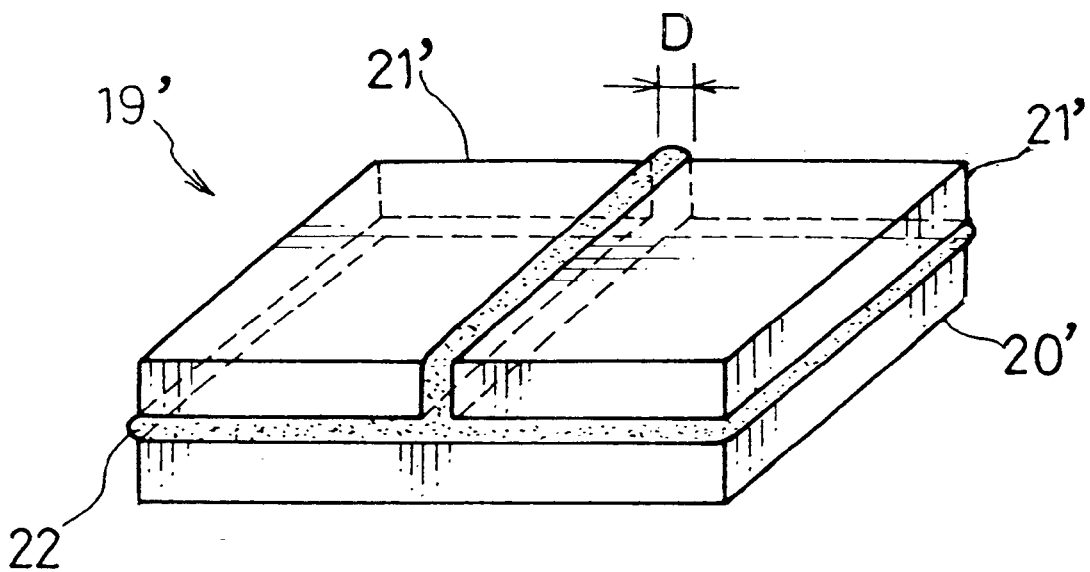
FIG. 10 is a perspective view showing a structure of another sample.

The following descriptions will discuss still another embodiment of the present invention in reference to FIG. 9 and FIG. 10. For convenience in explanations, members having the same function as the aforementioned embodiment will be designated by the same reference numerals, and thus the descriptions thereof shall be omitted here.

It is described in the second embodiment that the width of the connected part of not more than 50 μm is sufficient for preventing generation of cracks, a peeling, etc., due to the curing shrinkage of the bonding agent 9. However, the index of refraction of the bonding agent 9 used in joining the liquid crystal panels 2 together varies depending on the composition, hardening conditions, or ambient temperature, etc. Therefore, in practice, it is difficult to adjust the index of refraction with accuracy of within the order of around 0.005 so that the index of refraction of the hardened bonding agent 9 is equal to that of the liquid crystal panel 2, and a variation to certain extent cannot be avoided when mass-producing the liquid crystal display device 1.

A comparison between FIG. 9(a) and FIG. 9(b) clearly reveals that an increased width D of the connected part between the liquid crystal panels 2 results in not only a greater image distortion observed through the bonding agent 9 but also results in changes in color. Therefore, as shown in FIG. 9(b), the narrower is the width D of the connected part, the more preferable is in consideration of the image distortion due to the photo-absorption and the birefringence of the layer of the bonding agent 9, and an improved display performance can be achieved.

However, in the aforementioned dicing device, a mesh of the blade used in cutting, the number of rotations of the blade, and the work feeding rate satisfy the following trade-off correlations. That is, when the work feeding rate is lowered, the processing precision would be improved but the processing efficiency would significantly lowered on the contrary. On the other hand, when the mesh of the blade is made smaller by rotating at high speed, the cut surface finishing precision would be improved, but deflection of the blade would be increased and the cut surface positioning precision would be lowered on the contrary. In the mass-production, it is difficult to have the cut surface positioning precision of not more than 50 $\mu$m while maintaining the cut surface finishing precision of not more than 5 $\mu$m.

To eliminate the described problem, the process of grinding the end surface portion 2c of the connected part of the liquid crystal panel 2 by a grindstone is added. As a result, without reducing the producing number of liquid crystal panels 2, the width D of the connected part of the liquid crystal panels 2 can be still reduced. Furthermore, by grinding the end surface portion 2c of the liquid crystal panels 2 after being cut by means of the aforementioned dicing device, a liquid crystal panel 2 of a cut surface positioning precision of not more than 10 $\mu$m can be obtained. Additionally, by adopting such liquid crystal panels 2, the width D of the space (connected part) between the liquid crystal panels 2 can be reduced to not more than 20 $\mu$m.

Liquid crystal panels 21' of different cut surface positioning precision are prepared by applying the described grinding process, and plural samples 19' shown in FIG. 10 are prepared using the resulting liquid crystal panels 21' to evaluate the visibility in response to variable width D of the connected part. The sample 19' is prepared by connecting the liquid crystal panels 21' (width 290 mm×depth 440 mm×thickness 2.2 mm) on the reinforcing substrate 20' (width 580 mm×depth 440 mm×thickness 2.8 mm) using the bonding agent 22. In each sample 19', the two liquid crystal panels 21' have the same cut surface positioning precision.

TABLE 1

Results of Evaluation of the Visibility

| CUT SURFACE POSITIONING PRECISION ($\mu$m) | MAXIMUM WIDTH OF CONNECTED PART BETWEEN LIQUID CRYSTAL PANELS ($\mu$m) | VISIBILITY |
|---|---|---|
| 50 | 100 | x |
| 40 | 80 | x |
| 30 | 60 | Δ |
| 20 | 40 | Δ |
| 10 | 20 | ○ |

*The evaluation of the visibility is made based on the objective analysis of evaluating changes in distortion and color of an image passed through the connected part of the liquid crystal panel.

Results of the measurement show that when the width D of the connected part is not more than 20 $\mu$m, a desirable liquid crystal display device exhibiting excellent visibility without having adverse effects from the variation in index of refraction of the bonding agent can be achieved. Namely, by adopting the liquid crystal panel of the cut surface positioning precision of not more than 10 $\mu$m, the width D of the connected part of not more than 20 $\mu$m can be ensured, thereby always ensuring a desirable visibility.

Fourth Embodiment

The following descriptions will discuss still another embodiment of the present invention in reference to FIG. 10. For convenience in explanations, members having the same function as the aforementioned embodiment will be designated by the same reference numerals, and thus the descriptions thereof shall be omitted here.

As described, in the case of adopting the dicing device for cutting the liquid crystal panel 2, when joining the liquid crystal panels 2 together by means of the bonding agent 9, a bonding agent 9 might not be spread entirely on the cut surface because of its irregularity, and fine bubbles would remain between the end surface portion 2c of the liquid crystal panel 2 and the bonding agent 9, which would cause light scattering. This probably means that the cut surface finishing precision of around 5 $\mu$m obtained from the dicing device is not sufficient to have desirable wettability between the bonding agent 9 and the end surface portion 2c.

To verify the described assumption, by applying the grinding process using a grindstone, plural liquid crystal panels 21' having different cut surface finishing precision are prepared in the previously described manner. Then, plural samples 19' are prepared so as to have structures shown in FIG. 10, and connected parts thereof are observed to evaluate the entrainment of the bubbles. In samples 19' used in the present embodiment, the width D of the connected part between the liquid crystal panels 21' is selected to be 100 $\mu$m so that the bubbles can be observed with ease.

TABLE 2

Results of Entrainment of Bubbles

| CUT SURFACE FINISHING PRECISION ($\mu$m) | ENTRAINMENT OF BUBBLES |
|---|---|
| 5 | YES |
| 4 | YES |
| 3 | YES |
| 2 | NO |
| 1 | NO |

The results in Table 2 show that the entrainment of bubbles is not observed when the cut surface finishing precision is not more than 2 µm. This prevents the scattering of light caused by the bubbles in the connected part, thereby obtaining a natural image.

Figure 11:
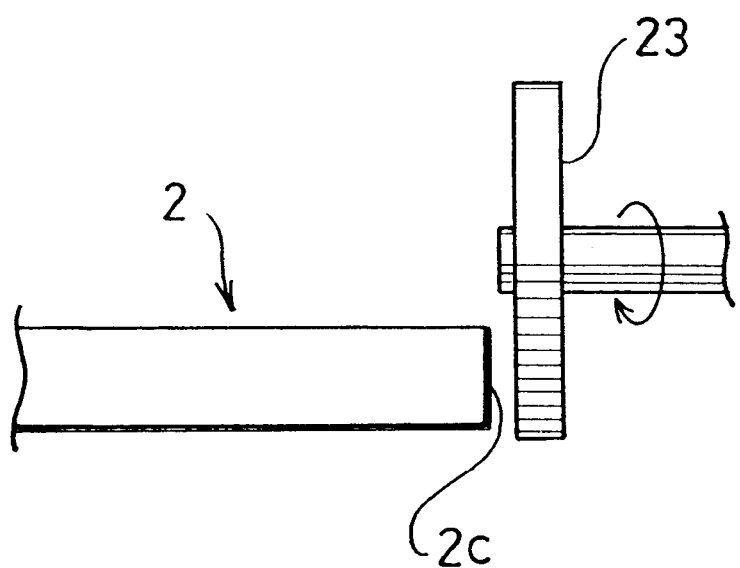
FIG. 11 is a view schematically showing the liquid crystal panel and a forming process of an end surface of a connected part of a liquid crystal panel of a liquid crystal display device in accordance with still another embodiment of the present invention.

In the aforementioned second through fourth embodiments, the grinding process of the end surface of the connected part of the glass substrate 21 and the liquid crystal panel 21' may be performed by grinding the end surface portion 2c by the rotating grindstone 23 as shown in FIG. 11. The grinding process is actually performed by a grindstone with particle size of #800 at a grinding speed at the contact portion between the grindstone and the end surface portion 2c of 1 km/min and a grindstone feeding amount of 2 µm/step. As a result, the end surface portion 2c having a cut surface positioning precision of not more than 10 µm and a cut surface finishing precision of not more than 2 µm can be obtained. When the end surface portion 2c is coarse before applying the grinding process, a still uniform end surface portion 2c can be obtained by performing a two-stage grinding process: first performing a coarse grinding coarse process using a grindstone with a particle size in a range of #300–#500, and thereafter performing a finishing grinding process using a grindstone with a particle size in a range of #800–#1,600.

In each of the described preferred embodiments, a liquid crystal display device of a multi-panel system of a large screen formed by joining two liquid crystal panels together is adopted. However, the present invention is not limited to such arrangement, and can be applicable to a liquid crystal display device of a large screen formed by joining more than two liquid crystal panels together.

Furthermore, in each of the described preferred embodiments, a large screen formed by joining plural liquid crystal panels together is applied to the liquid crystal display device of a multi-panel system. However, such method of obtaining a large screen can be equally applied to other multi-panel displays using plasma displays, EL (electro luminescent) displays, etc.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A liquid crystal display, comprising:
    plural display panels, adjoining display panels being connected with each other by means of a bonding agent, so as to have a single display screen;
    a reinforcing substrate bonded to each respective liquid crystal display panel by means of the bonding agent; and
    wherein at least one edge portion of an end surface of a connected part of each display panel is chamfered, the at least one edge being chamfered also being a curing shrinkage of the bonding agent when joining adjacent display panels is suppressed at the chamfered edge portion.

2. The display device as set forth in claim 1, wherein:
    each display panel is a liquid crystal display panel including a pair of substrates which sandwich a liquid crystal.

3. The display device as set forth in claim 2, wherein:
    the bonding agent is made of a material of an index of refraction substantially equal to that of said pair of substrates.

4. The display device as set forth in claim 3, wherein said reinforcing substrate has an index of refraction substantially equal to that of said pair of substrates.

5. The display device as set forth in claim 4, wherein:
    each liquid crystal display panel and said reinforcing substrate are sandwiched by a pair of polarization plates whose polarization axes intersect at right angles.

6. The display device as set forth in claim 5, wherein one of said pair of substrates includes:
    plural pixel electrodes placed in a matrix form,
    plural signal electrodes for supplying an image signal to each pixel electrode and plural scanning electrodes provided as an electric wiring, and
    plural active elements connected to each pixel electrode, for controlling a supply of an image signal to each pixel electrode, and
    an other of said pair of substrates includes:
        a black matrix for blocking light entering spaces between said pixel electrodes or incident on said active element,
        a color filter composed of filters in red, green and blue arranged in a prescribed pattern corresponding to respective pixel electrodes, and
        a common electrode provided opposing the pixel electrode, for applying a voltage to the liquid crystal together with said pixel electrodes.

7. The display device as set forth in claim 1 further comprising:
    plural display panels, adjoining display panels being connected with each other by means of a bonding agent, so as to have a single display screen; and
    wherein an end surface of a connected part of each display panel has a cut surface finishing precision of 2 µm or less.

8. The display device as set forth in claim 7, wherein:
    each display panel is a liquid crystal display panel including a pair of substrates which sandwich a liquid crystal.

9. The display device as set forth in claim 8, wherein:
    the bonding agent is made of a material of an index of refraction substantially equal to that of said pair of substrates.

10. The display device as set forth in claim 9, comprising:
    a reinforcing substrate bonded to each liquid crystal display panel by means of the bonding agent, said reinforcing substrate having an index of refraction substantially equal to that of said pair of substrates.

11. The display device as set forth in claim 10, wherein:
    each liquid crystal display panel and said reinforcing substrate are sandwiched by a pair of polarization plates whose polarization axes intersect at right angles.

12. The display device as set forth in claim 11, wherein one of said pair of substrates includes:
    plural pixel electrodes placed in a matrix form,
    plural signal electrodes for supplying an image signal to each pixel electrode and plural scanning electrodes provided as an electric wiring, and
    plural active elements connected to each pixel electrode, for controlling a supply of an image signal to each pixel electrode, and
    an other of said pair of substrates includes:
        a black matrix for blocking light entering spaces between said pixel electrodes or incident on said active element,
        a color filter composed of filters in red, green and blue arranged in a prescribed pattern corresponding to respective pixel electrodes, and
        a common electrode provided opposing the pixel electrode, provided as an electric wiring, for applying a voltage to the liquid crystal together with the pixel electrode.

13. The display device as set forth in claim 11, wherein each of the pair of polarization plates is provided so as to cover substantially an entire surface of the single display screen constituted by the plural display panels.

14. A manufacturing process of a display device which comprises plural display panels, adjoining display panels being connected with each other by means of a bonding agent, so as to have a single display screen, comprising the step of:

grinding at least one edge portion of an end surface of a connected part of each display panel, in an arc shape, by means of a grindstone.

15. The display device as set forth in claim 14, further comprising:

plural display panels, adjoining display panels being connected with each other by means of a bonding agent, so as to have a single display screen; and wherein an end surface of a connected part of each display panel has a cut surface finishing precision of 2 μm or less.

16. The display device as set forth in claim 15, wherein each display panel is a liquid crystal display panel including a pair of substrates which sandwich a liquid crystal.

17. The display device as set forth in claim 16, wherein the bonding agent is made of a material of an index of refraction substantially equal to that of said pair of substrates.

18. The display device as set forth in claim 17, comprising a reinforcing substrate bonded to each liquid crystal display panel by means of the bonding agent, said reinforcing substrate having an index of refraction substantially equal to that of said pair of substrates.

19. The display device as set forth in claim 18, wherein:
each liquid crystal display panel and said reinforcing substrate are sandwiched by a pair of polarization plates whose polarization axes intersect at right angles.

20. The display device as set forth in claim 19, wherein one of said pair of substrates includes:

plural pixel electrodes placed in a matrix form, plural signal electrodes for supplying an image signal to each pixel electrode and plural scanning electrodes provided as an electrical wiring, and plural active elements connected to each pixel electrode, for controlling a supply of an image signal to each pixel electrode; and wherein an other of said pair of substrates includes
a black matrix for blocking light entering spaces between said pixel electrodes or incident on said active element,
a color filter composed of filters in red, green and blue arranged in a prescribed pattern corresponding to respective pixel electrodes, and
a common electrode provided opposing the pixel electrode, provided as an electrical wiring, for applying a voltage to the liquid crystal together with the pixel electrode.

21. The display device as set forth in claim 19, wherein each of the pair of polarization plates is provided so as to cover substantially an entire surface of the single display screen constituted by the plural display panels.

22. The manufacturing process as set forth in claim 14, wherein the edge portion is ground in an arc shape having a radius of 0.3 mm.

23. The manufacturing process as set forth in claim 14, wherein the step of grinding includes performing a coarse grinding process using a grindstone having particle size in the range of #300 to #500 and after performing the coarse grinding process, performing a finishing grinding process using a grindstone having particle size in the range of #800 to #1600.

24. The display device as set forth in claim 5, wherein each of the pair of polarization plates is provided so as to cover substantially an entire surface of the single display screen constituted by the plural display panels.

25. The manufacturing process as set forth in claim 14, where the end surface of a connected part of the display panel has a cut surface finishing precision of 2 μm or less, the manufacturing process further comprising the step of:

grinding the end surface using a grindstone with particle size of #800 at a grinding speed at a contact portion between the grindstone and the end surface of 1 km/min and a grindstone feeding amount of 2 μm/step.

26. The manufacturing process, as set forth in claim 23, wherein:

two kinds of grindstones are provided, one having particle size in the range of the #300–#500 and the other having particle size in the range of #800 to #1600; and the step of grinding includes performing a course grinding process using the grindstone having the particle size in the range of #300 to #500 and after performing the coarse grinding process, performing a finishing grinding process using the grindstone having the particle size in the range of #800 to #1600.

27. The manufacturing process as set forth in claim 14, where the end surface of a connected part of each display panel has a cut surface positioning precision of 10 μm or less, the manufacturing process further comprising the step of:

grinding the end surface using a grindstone with particle size of #800 at a grinding speed at a contact portion between the grindstone and the end surface of 1 km/min and a grindstone feeding amount of 2 μm/step.

28. The manufacturing process as set forth in claim 25, wherein:

two kinds of grindstones are provided, one having particle size in the range of the #300–#500 and the other having particle size in the range of #800 to #1600; and the step of grinding includes performing a coarse grinding process using the grindstone having the particle size in the range of #300 to #500 and after performing the coarse grinding process, performing a finishing grinding process using the grindstone having the particle size in the range of 190 800 to #1600.

29. The display device as set forth in claim 25, wherein an interval, between opposing end surfaces of adjoining panels having a cut surface positioning precision of 10 μm, is set so as to be no more than 20 μm.

30. The display device as set forth in claim 29, wherein:
each display panel is a liquid crystal display panel including a pair of substrates which sandwich a liquid crystal.

31. The display device as set forth in claim 30, wherein:
said bonding agent is made of a material having an index of refraction substantially equal to that of said pair of substrates.

32. The display device as set forth in claim 31, further comprising:

a reinforcing substrate bonded to each liquid crystal display panel by means of the bonding agent, said reinforcing substrate having an index of refraction substantially equal to that of said pair of substrates.

33. The display device as set forth in claim 32, wherein:

each liquid crystal display panel and the reinforcing substrate are sandwiched by a pair of polarization plates whose polarization axes intersect at right angles.

34. The display device as set forth in claim 33, wherein one of said pair of substrates includes:

plural pixel electrodes placed in a matrix form, plural signal electrodes for supplying an image signal to each pixel electrode and plural scanning electrodes provided as an electric wiring, and plural active elements connected to each pixel electrode, for controlling a supply of an image signal to each pixel electrode, and an other of said pair of substrates includes:

a black matrix for blocking light entering spaces between said pixel electrodes or incident on said active element, a color filter composed of filters in red, green and blue arranged in a prescribed pattern corresponding to respective pixel electrodes, and a common electrode provided opposing the pixel electrode, for applying a voltage to the liquid crystal together with said pixel electrodes.

35. The display device as set forth in claim 34, wherein each of the pair of polarization plates is provided so as to cover substantially an entire surface of the single display screen constituted by the plural display panels.

* * * * *